United States Patent
Hayashi et al.

(10) Patent No.: US 6,494,976 B1
(45) Date of Patent: Dec. 17, 2002

(54) ULTRASONICALLY JOINING APPARATUS AND ULTRASONICALLY JOINING METHOD

(75) Inventors: Takayuki Hayashi, Aichi-gun (JP); Hiroo Yamaguchi, Toyohashi (JP); Takaki Okochi, Chiryu (JP); Takeshi Iguchi, Gifu (JP); Toshinari Sasaki, Okazaki (JP); Kazuaki Kafuku, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/573,436

(22) Filed: May 16, 2000

(30) Foreign Application Priority Data

| May 18, 1999 | (JP) | .............................................. 11-137270 |
| Jul. 23, 1999 | (JP) | .............................................. 11-209591 |
| Mar. 13, 2000 | (JP) | .............................................. 2000-069094 |

(51) Int. Cl.⁷ .............................................. B32B 31/16
(52) U.S. Cl. .................... 156/73.1; 156/292; 156/580.1; 156/580.2
(58) Field of Search ................ 156/73.1, 73.3, 156/290, 292, 308.2, 308.4, 309.6, 580.1, 580.2

(56) References Cited

U.S. PATENT DOCUMENTS

| 4,975,133 A | * | 12/1990 | Gochermann | .............. 156/73.1 |
| 5,525,172 A | * | 6/1996 | Cadiou | .................. 156/73.1 |
| 5,599,411 A | * | 2/1997 | Schembri | .................. 156/73.1 |
| 5,615,998 A | | 4/1997 | Kodama et al. | ............ 415/175 |
| 5,676,778 A | * | 10/1997 | Marblr | .................. 156/73.1 |
| 5,830,300 A | * | 11/1998 | Suzuki et al. | .............. 156/73.1 |
| 5,947,364 A | * | 9/1999 | Tamura et al. | ................ 228/1.1 |

FOREIGN PATENT DOCUMENTS

| JP | A 62-217646 | 9/1987 |
| JP | A 9-253774 | 9/1997 |

* cited by examiner

*Primary Examiner*—James Sells
(74) *Attorney, Agent, or Firm*—Harness, Dickey & Pierce, PLC (57) ABSTRACT

A cooling device has a radiator plate and a corrugated fin for cooling an electrical component. In a manufacturing process of the cooling device, a symmetrically constructed tool section presses the radiator plate and the fin against an anvil. The radiator plate has an attaching portion where an electrical component is attached. Knurled surface for preventing a slide is formed on the tool section only at a surrounding area to prevent a deformation of the attaching portion. The tool section and the radiator plate vibrate ultrasonically in a longitudinal direction of corrugations of the fin to prevent a crack on the fin.

13 Claims, 8 Drawing Sheets

ULTRASONICALLY JOINING APPARATUS AND ULTRASONICALLY JOINING METHOD

CROSS REFERENCE TO RELATED APPLICATION

This application is based on Japanese Patent Applications No. Hei 11-137270 filed on May 18, 1999, No. Hei 11-209591 filed on Jul. 23, 1999 and No. 2000-69094 filed on Mar. 13, 2000, the contents of which are incorporated herein by reference.

BACKGROUND OF THE INVENTION

1. Field of the Invention

The present invention relates to an apparatus and a method for ultrasonically joining two members and a cooling device having ultrasonically joined members. For instance, the members to be joined are a radiator for radiating heat from an attached electrical component and a corrugated fin thinner than a radiator plate.

2. Description of Related Art

JP-A-8-83873 discloses a cooling device having a small blower located on a radiator plate on which a heat generator such as a CPU is attached. In this cooling device, a corrugated fin for improving heat radiation is thermally coupled with the radiator plate.

JA-A-9-253774 discloses a process for joining a thin corrugated fin and a plate ultrasonically.

According to the above-mentioned prior art, an ultrasonically joining apparatus has notched surfaces. The notched surfaces hold the fin and the plate securely and prevent a slide thereon. However, the notched surface makes a deformation on the plate. Such a deformation may increase resistance of heat conduction at a surface of the plate. As a result, it is likely that radiating efficiency decreases, and cooling capacity lowers.

JP-A-62-217646 discloses an ultrasonically joining method for joining thinner fins on a plate by vibrating the fins relative to the plate. However, according to experimental tests, cracks had been formed on the fins, specifically cracks had been formed near the louver mainly.

SUMMARY OF THE INVENTION

The present invention addresses these drawbacks by providing an improved apparatus and method for ultrasonically joining two members.

It is therefore an object of this invention to provide an improved apparatus and method, which don't form deformation on a predetermined area of the member.

It is another object of this invention to improve a cooling efficiency of a cooling device.

It is a further object of this invention to provide an improved apparatus and method for ultrasonically joining a radiator plate and a fin of a cooling device.

It is a still further object of this invention to prevent deformation on an attaching surface of a radiator plate of a cooling device.

It is a still further object of this invention to prevent cracks on a fin of a cooling device.

It is a still further object of this invention to provide an improved cooling device.

According to a first aspect of the present invention, an apparatus for ultrasonically joining two members has a horn. The horn has a high friction surface for preventing a slide of the horn relative to the member. The high friction surface is not formed on a portion of the horn in correspondence with a first portion of the member. This apparatus prevents a deformation on the first portion of the member. Therefore, a flatness of the first portion is maintained even after the horn is pressed on the member and the horn vibrates ultrasonically.

According to a second aspect of the present invention, a method for ultrasonically joining two members includes a cutting step. In the cutting step, the high friction surface formed on the horn is cut into the second portion of the member to hold the member securely. Therefore, the first portion of the member is not deformed by the high friction surface.

The first portion of the member can provide close contact with a component to be cooled. The apparatus and method of the present invention can be applied to a manufacturing apparatus and method for a cooling device to improve a cooling efficiency.

According to a third aspect of the present invention, a method for ultrasonically joining two members includes pressing and vibrating step. In the step, a horn presses a first member against a second member thinner than the first member, and vibrates the first member relative to the second member.

The first member may be a radiator plate as a heat sink. The second member may be a fin of a cooling device.

Other features and advantages of the present invention will be appreciated, as well as methods of operation and the function of the related parts, from a study of the following detailed description, the appended claims, and the drawings, all of which form a part of this application.

DETAILED DESCRIPTION OF PREFERRED EMBODIMENTS

Figure 1:
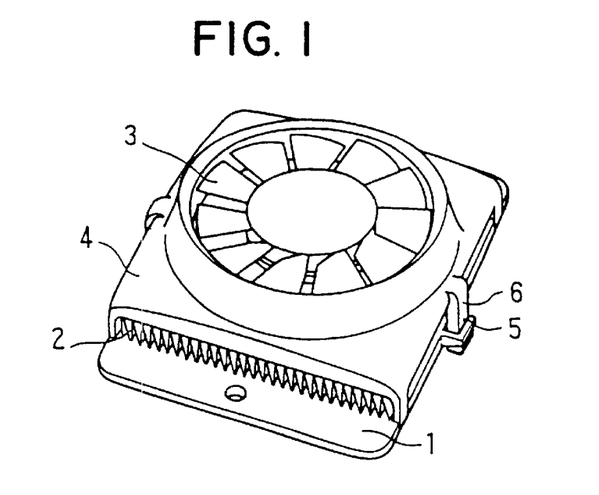
FIG. 1 is a perspective view showing a cooling device manufactured by embodiments of the present invention.
Figure 2:
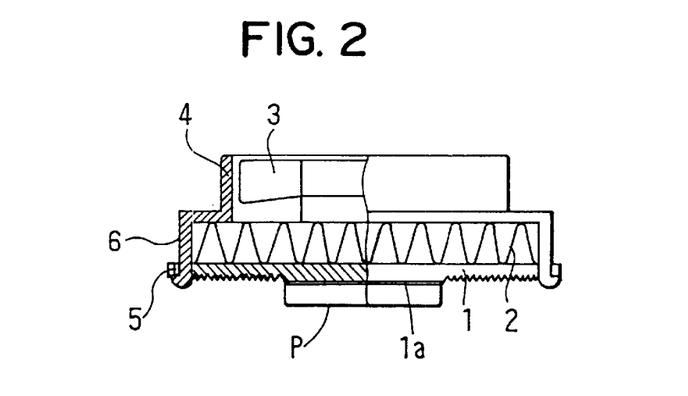
FIG. 2 is a cross sectional view of the cooling device manufactured by the embodiments of the present invention.

Hereafter, embodiments of the present invention will be described based on the drawings. As shown in FIG. 1 and FIG. 2, a cooling device to which the present invention is applied has a radiator plate as a first member and a fin as a second member.

A radiator plate 1 is made of aluminum alloy, and closely contacts a heat generator (e.g., an electrical component P such as a heater, a CPU (central processing unit) and a LSI). An attaching side of the radiator plate 1 has an approximate flat portion (referred to as a first portion) where the electrical component P is attached. The flat portion provides close contact the electrical component P so that a heat resistance between the electrical component P and the radiator plate 1 is minimized. The other portion of the attaching side of the radiator plate 1 is referred to as a second portion.

A corrugated fin 2 having louvers 21 on its plan surface is disposed on the radiator plate 1. The fin 2 is made of aluminum alloy sheet the thickness of which is 0.1 mm. The fin 2 is joined on the radiator plate 1 to make a heat conductive contact.

An axial flow-type blower 3 is supported on the fin by a blower case 4. The blower case 4 is made of a saturated-polyester, ABS resin or the like. A cylindrical shroud is formed in the blower case 4 to surround the blower 3. A cross section of the shroud portion is formed as a bell-mouth. The blower case 4 has an integrally formed leg portions 6. Each leg portion 6 is coupled to a coupling hole 5 of the radiator plate 1 with an elastic deformation. ADC brush-less motor (not shown) is disposed behind a boss portion of the blower 3. The motor is a small motor having one-watt to three-watt.

Referring to FIGS. 3 to 7, an apparatus for joining the radiator plate 1 and the fin 2 ultrasonically will be described. An oscillator 7 generates a high frequency electric power. A vibrator 8 transforms the high frequency electric power into mechanical vibration which is an ultrasonic vibration. A cone 8a converts mechanical vibration from the vibrator 8 and transmits the vibration to a horn 9. The horn 9 transmits mechanical vibration to a member to be joined. The horn 9 has a tool section 9a to be contacted the radiator plate 1 and transmitting sections 9b for transmitting vibration from the vibrator 8 to the tool section 9a. The transmitting sections 9b are disposed on both sides of the tool section 9a in a direction of vibration of an ultrasonic wave. The transmitting section 9b is constructed so that a center of the fin 2 in a width direction corresponds to a portion where energy of vibration transmitted to the fin is maximized. An anvil 13 is placed under the tool section 9a. The anvil 13 has a plurality of comb-shaped blades 13a to engage a wave-shape of the fin 2.

Figure 5:
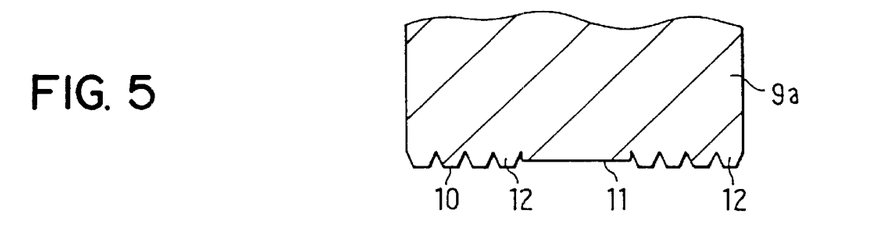
FIG. 5 is a cross sectional view of a tool used in the first embodiment.
Figure 6:
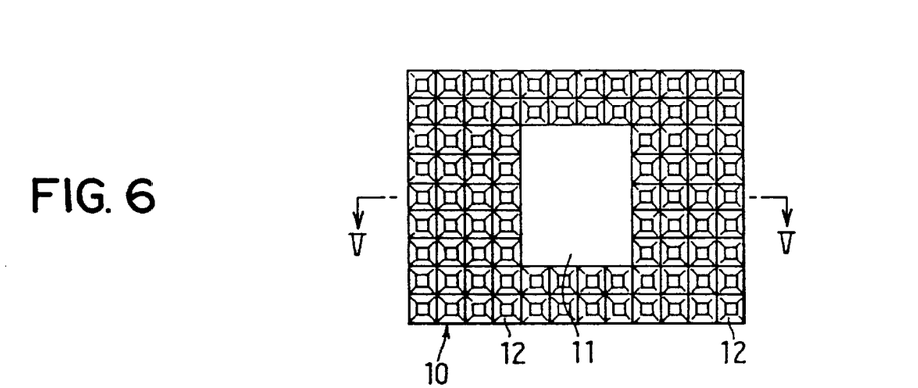
FIG. 6 is a plan view of the tool showing a contact surface of the first embodiment.

The tool section 9a has a contact surface 10 opposing the radiator plate 1. The contact surface 10 has a flat surface 11 and a knurled surface having a plurality of knurls 12. The flat surface 11 is formed on an approximate center of the contact surface 10. The knurled surface surrounds the flat surface 11. The flat surface 11 contacts a portion 1a where the electrical component P is attached. Each knurl 12 has a trapezoidal pyramid-shape. The knurled surface acts as a high friction surface for preventing a slide of the tool section 9a relative to the radiator plate 1. The flat surface 11 provides a protective surface which is more harmless to the radiator plate than the knurled surface.

Next, a joining method by the above-mentioned ultrasonically joining apparatus will be described.

Figure 7:
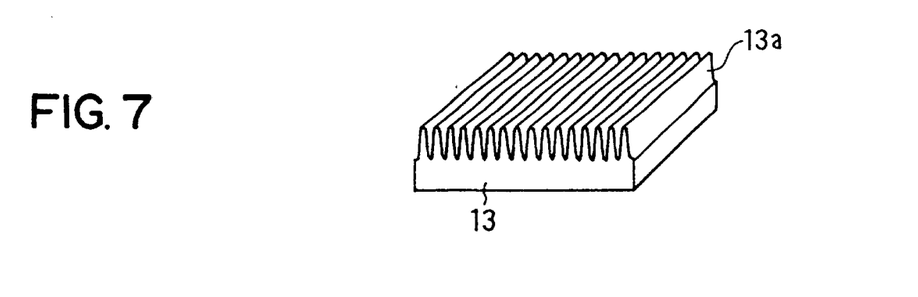
FIG. 7 is a perspective view of an anvil used in the first embodiment.

In a preceding process, which is not shown, the fin 2 is positioned on the anvil 13. At this time, the fin 2 is positioned so that the blades 13a of anvil 13 are inserted into mountains of the wave-shape of the fin 2, respectively. After that, the radiator plate 1 is positioned on the fin 2. Therefore, it is possible to prevent a deformation of the fin 2, even if the fin 2 is pressed by the horn 9 at a joining process.

Figure 4:
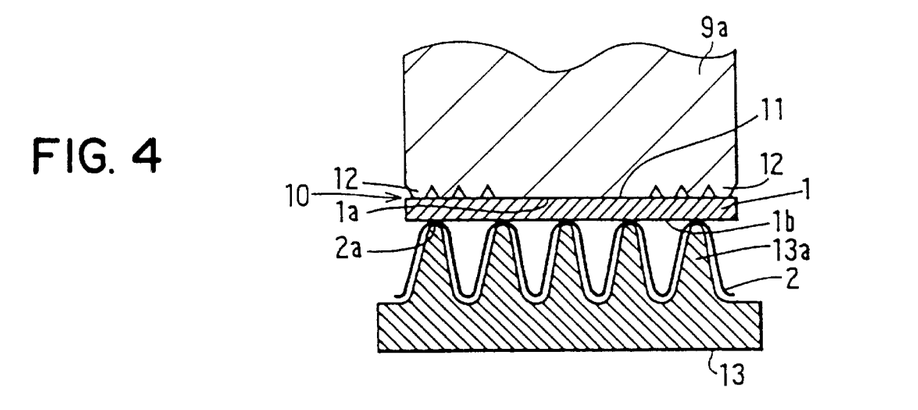
FIG. 4 is a cross sectional view of the ultrasonically joining apparatus and the cooling device of the first embodiment.

Next, the horn 9 is moved downwardly to sandwich the fin 2 and the radiator plate 1. Further, a press machine, which is not shown, presses the radiator plate 1 and the fin 2 through the horn 9.

Figure 3:
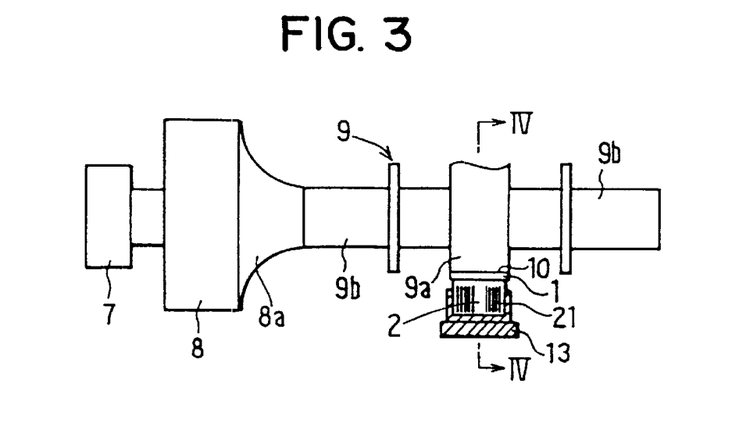
FIG. 3 is a side elevation view of an ultrasonically joining apparatus according to a first embodiment of the present invention.

The vibrator 8 is activated based on the high frequency electric power from the oscillator 7. The horn transmits the ultrasonic vibration of the vibrator 8 to the radiator plate 1. A joining surface 1b of the radiator plate 1 and a joining surface 2a of the fin 2 are rubbed by the ultrasonic vibration. Then, oxide layers on both surfaces 1b and 2a are removed and both surfaces 1b and 2a are cleaned. Therefore, the radiator plate 1 and the fin 2 are joined into a condition similar to a diffusion.

The knurls 12 cut into the radiator plate 1 and hold the radiator plate 1 tightly. Therefore, the radiator plate 1 is vibrated by the horn 9. A transmitting loss of the ultrasonic vibration is suppressed. As a result, rubbing and cleaning of the contact surfaces 1b and 2a are carried out sufficiently. It is possible to improve strength of the joining between the radiator plate 1 and the fin 2.

Figure 8:
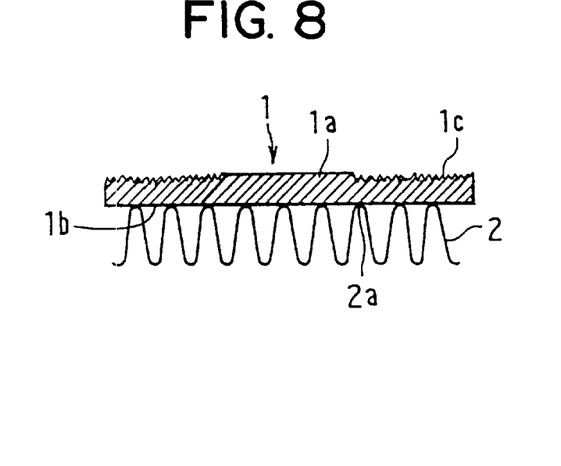
FIG. 8 is a cross sectional view of a radiator plate and a fin after completion of the joining process of the first embodiment.

Referring to FIG. 8, a part of the cooling device of this embodiment has a flat surface 1a as a first portion and an uneven surface 1c as a second portion. The flat portion provides an attaching portion 1a for attaching the electrical component P thereon. The uneven surface 1c is covered by dimples which is a joining mark formed by pressing the knurled surface thereon. In this embodiment, the flat surface 11 is formed on the horn 9 in correspondence with the portion 1a where the electrical component P is attached. Accordingly, the radiator plate 1 and the electrical component P can closely contact each other when the cooling device is attached on the electrical component P. As a result, the electrical component P can be cooled effectively.

Specifically, the knurled surface is formed completely around the flat surface 11. Therefore, it is possible to hold the radiator plate 1 tightly even the knurls 12 are not formed all over the contact surface 10.

Figure 15:
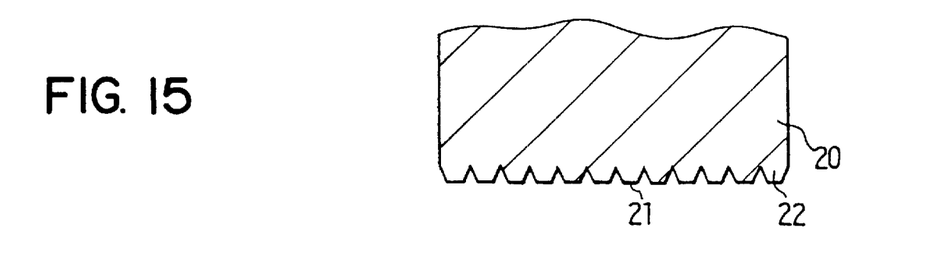
FIG. 15 is a cross sectional view of a tool used in the comparative embodiment.
Figure 16:
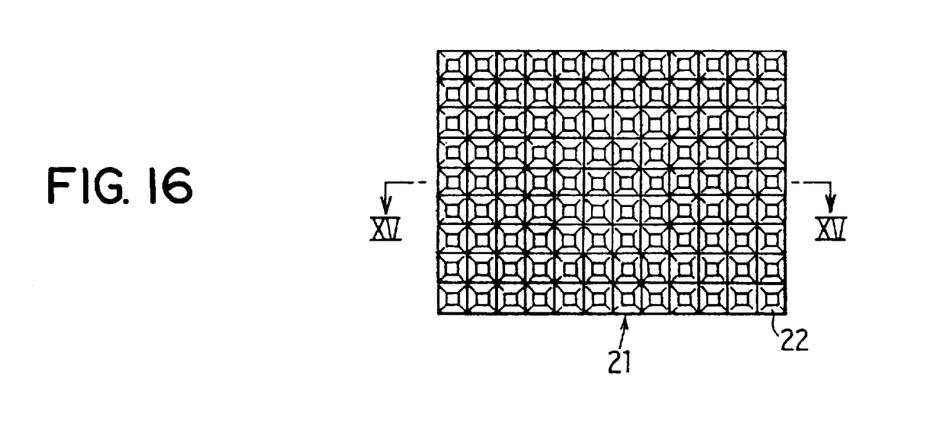
FIG. 16 is a plan view of the tool used in the comparative embodiment.
Figure 17:
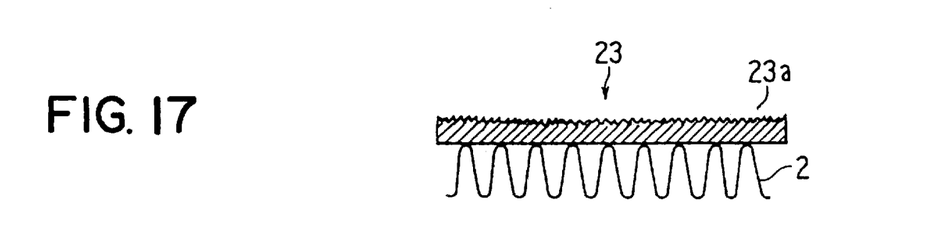
FIG. 17 is a cross sectional view of a radiator plate and a fin after completion of a joining process of the comparative embodiment.

Referring to FIGS. 15 to 17, a comparative embodiment of a joining apparatus and a cooling device will be described. In the comparative embodiment, knurls 22 are formed on an entire contact surface 21 of the horn 20. The knurls 22 are formed as a slide preventing construction of the horn 20. Therefore, after completion of joining, uneven surface 23a having dimples are formed on an entire surface of the radiator plate. A resistance of heat conduction of this comparative embodiment is higher than the above-mentioned embodiment.

Figure 13:
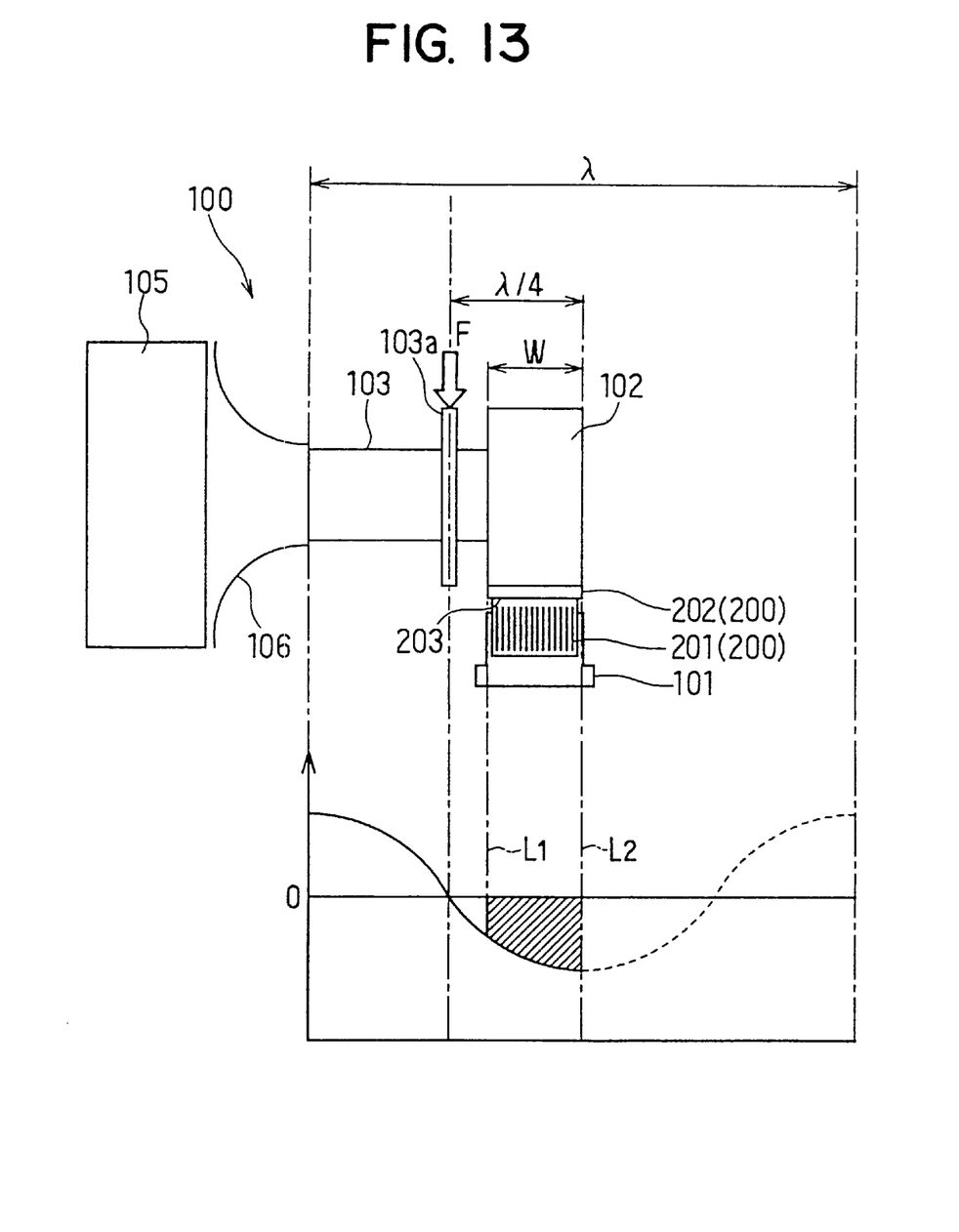
FIG. 13 is a schematic view showing a vibration mode of an ultrasonically joining apparatus of a comparative embodiment.
Figure 14:
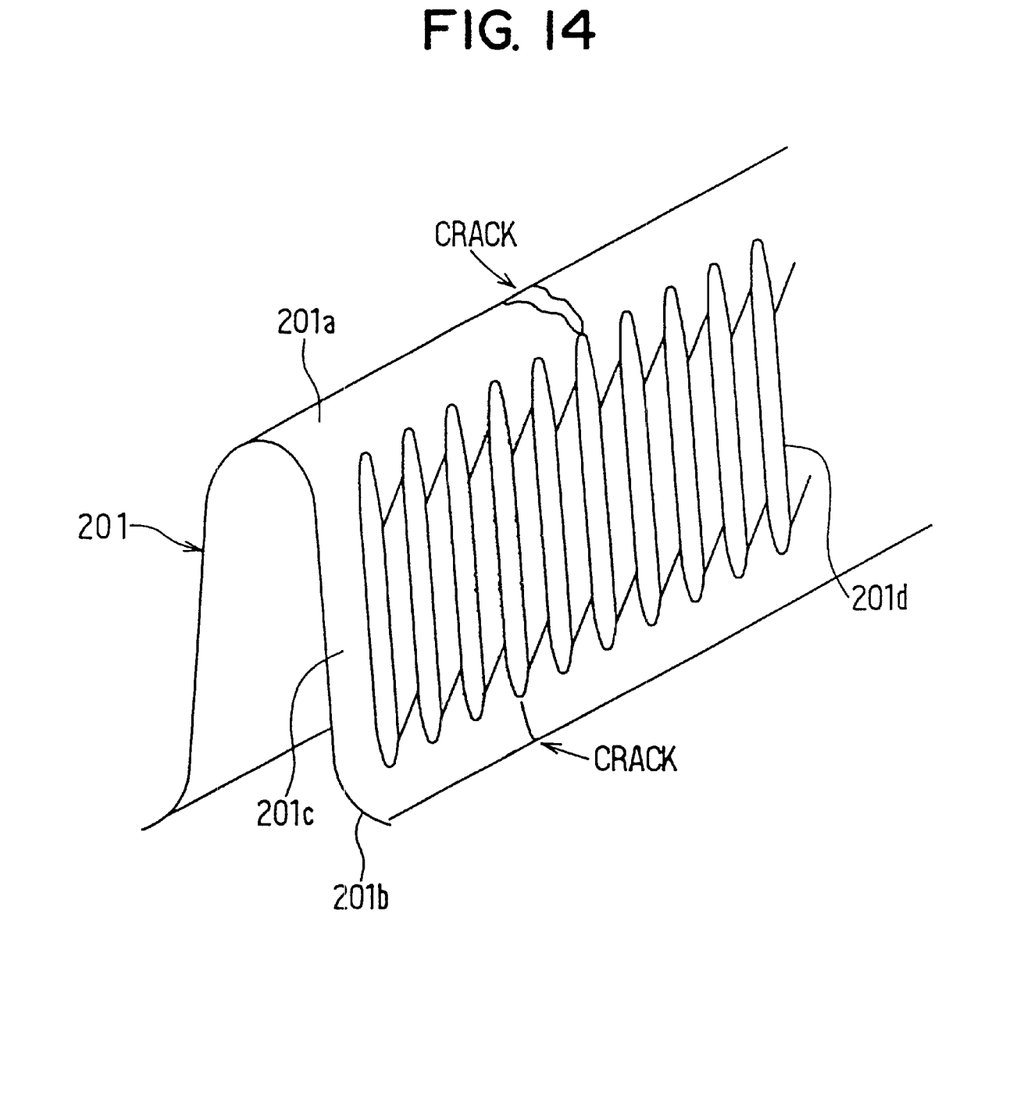
FIG. 14 is an enlarged perspective view of a fin processed in the comparative embodiment.

The horn 9 of the first embodiment can be used for an apparatus having only one transmitting section as shown in FIG. 13.

Figure 9:
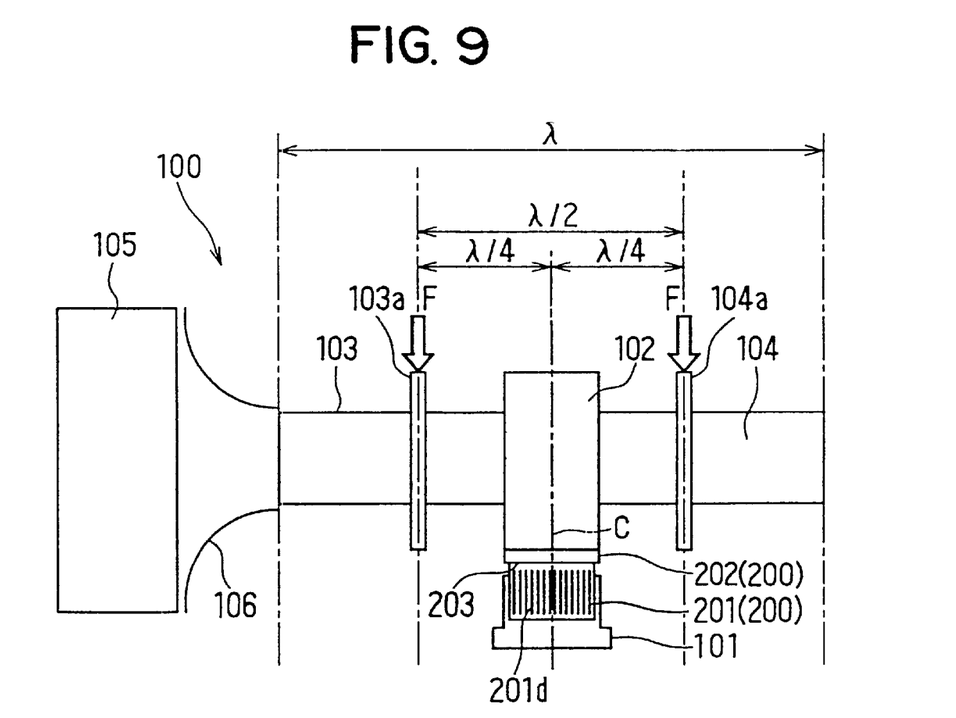
FIG. 9 is a side elevation view of an ultrasonically joining apparatus of a second embodiment of the present invention.
Figure 10:
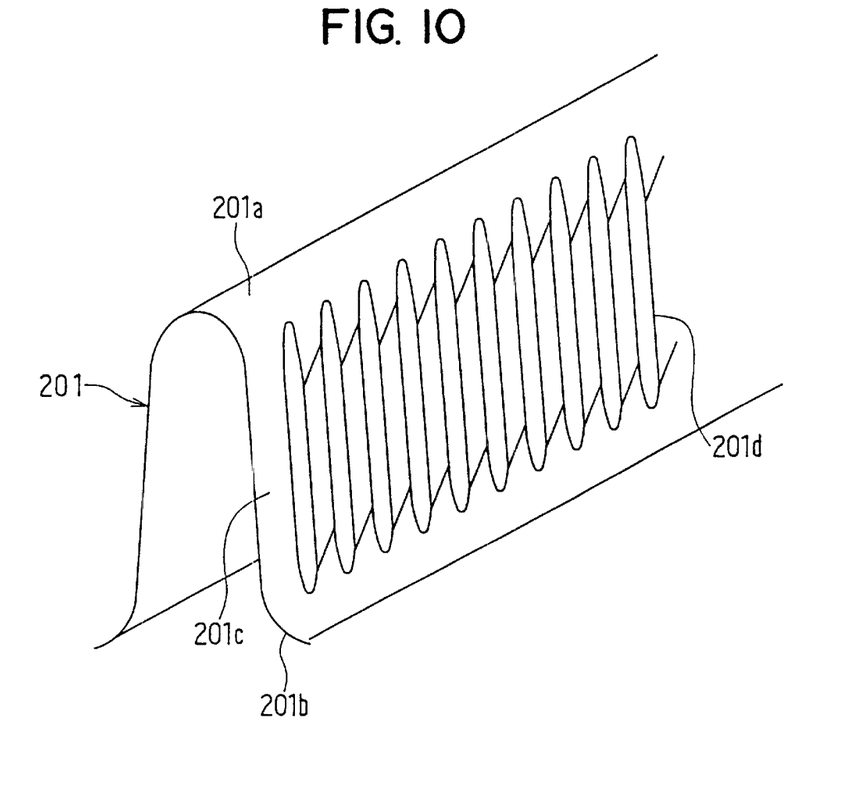
FIG. 10 is an enlarged perspective view of a fin processed in the second embodiment.

Referring to FIGS. 9 to 12, a second embodiment of the present invention will be described. A product 200 is a CPU cooler as shown in FIGS. 1 and 2. The CPU cooler 200 has a corrugated fin (hereafter referred to as a fin) 201 and a radiator plate 202. The fin 201 is thinner than the plate 202. The thickness of the fin 201 is about 2% to 5% of the plate 202, that is, it is about 0.05 mm to 0.5 mm. The thickness of the fin 201 may be about 1% to 50% of the plate 202. As shown in FIG. 10, the fin 202 has plan sections 201c located between mountain sections 201a and valley sections 201b. A louver 201d is formed on the plan sections 201c, respectively.

Figure 11:
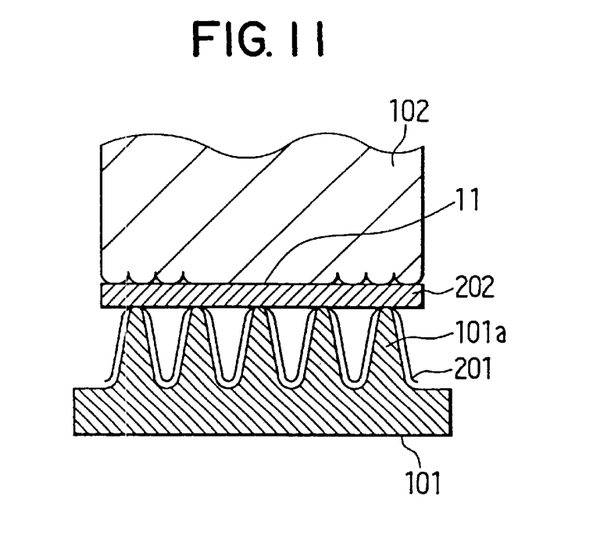
FIG. 11 is a cross sectional view of the ultrasonically joining apparatus and the cooling device in the second embodiment.

In this embodiment, a joining apparatus 100 is similar to the first embodiment. An anvil (lower support) 101 supports the fin 201. A horn has an tool section 102, a cylindrical first horn 103 and a cylindrical second horn 104. The first horn 103 and the second horn 104 are joined on both sides of the tool section 102, respectively. The horns 103 and 104 are disposed to extend in a direction of vibration. The first horn 103 is extended toward one side (left side). The second horn 104 is extended toward another side (right side).

An ultrasonic vibrator 105 (hereafter referred to as a vibrator) disposed on a side of the first horn 103. The vibrator 105 vibrates itself in a parallel with a longitudinal axis (expanding direction) of the both of horns 103 and 104. The first horn 103 transmits the vibration of the vibrator 105 to the tool section 102.

Here, a vibration system including the first horn 103, the second horn 104 and the tool section 102 has a predetermined length in its longitudinal direction. The length is selected to be an integral multiple (multiplied by one, in this embodiment) of a vibration wave length λ generated by the vibrator 105. Therefore, a natural frequency (resonance frequency) of the system corresponds to the integral multiple (this embodiment is multiplied by one) of a vibration frequency of the vibrator 105.

A cone-shaped booster horn 106 is located between the vibrator 105 and the first horn 103. The booster horn 106 converts and modifies amplitude of the vibration and transmits the vibration to the first horn 103.

Ring-shaped first receiver 103a and second receiver 104a are disposed on the first horn 103 and the second horn 104, respectively. The receivers 103a and 104a receives pressing force F from a press machine (not shown) such as a pneumatic press or a mechanical press. The pressing force F received by the receivers 103a and 104a apply for the fin 201 and the plate 202. A distance between the first receiver 103a and the second receiver 104a is equal to an odd number multiple (multiplied by one, in this embodiment) of a half of the vibration wave length λ. The first horn 103, the second horn 104, the tool section 102, the first receiver 103a and the second receiver 104a are symmetrically disposed about a centerline (reference normal line) C. The centerline C passes through the center of the plate 202 and the fin 201.

In a joining process, at first, the fin 201 is positioned on the anvil 101. The plate 202 is positioned to contact the fin 201. The tool section 102 is moved from above to contact the plate 202. Microscopic unevenness (dimples) is formed on a contact surface of the tool section 102 as a high friction surface.

The press machine applies the pressing force F to the first receiver 103a and the second receiver 104a. The vibrator 105 vibrates while the pressing force F is applied. The vibration system including the first horn 103, the second horn 104 and the tool section 102 forcedly vibrates.

The plate 202 vibrates relative to the fin. Friction heat raises a temperature of a contact surface 203 between the plate 202 and the fin 201. At the same time, microscopic protrusions on the contact surface 203 are plastically deformed and a surface roughness of the contact surface 203 is extremely lowered. Distances between atoms of the plate 202 and the fin 201 on the contact surface 203 are decreased and the van der Waals force acts between both atoms is increased. As a result, the plate 202 and the fin 201 are joined. According to tests, this embodiment prevents a crack on the fin.

Figure 12:
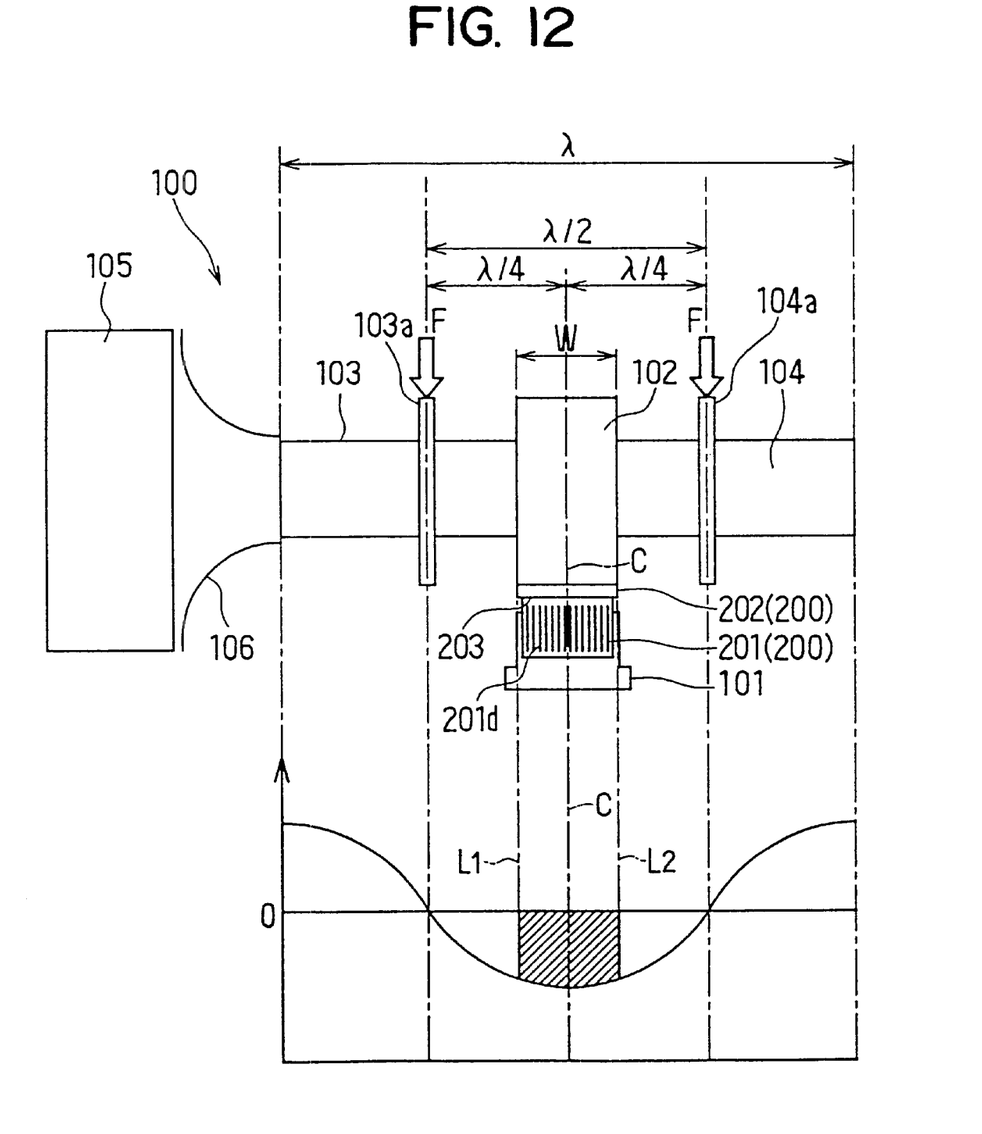
FIG. 12 is a schematic view showing a vibration mode of the ultrasonically joining apparatus of the second embodiment.

As shown in FIG. 12, it is clearly understood that the centerline C is positioned where amplitude (energy of vibration) of the vibration system is maximized. According to the joining apparatus of the embodiment, energy of vibration indicated by the hatched area in FIG. 12 is consumed for joining the plate and the fin. The area is defined by limit-lines L1 and L2 corresponding to a width of the contact surface 203 (W is a width parallel to the vibrating direction).

As shown in FIG. 13, in a comparative embodiment, a limit-line L2 is located where amplitude is maximized. Therefore, energy of vibration consumed for joining is smaller than that of the first and second embodiments.

According to the first and second embodiments, it is possible to provide sufficient vibration even on the ends of the plate. Therefore, it is possible to enlarge the joinable area relative to the apparatus shown in FIG. 13. It is possible to join entirety of the plate 202 on the fin 201 evenly.

In the above-mentioned embodiments, sufficient vibration is achieved on both ends of the plate 202 (approximately to the limit-lines L1 and L2).

The centerline C (hereafter referred to as a first centerline) corresponds to the centerline (hereafter referred to as a second centerline) which passes through the center of the tool section 102 and is extended to cross at right angles with the direction of vibration in the above-mentioned embodiments. However, the first centerline C may be shifted a little distance from the second centerline. However, the second centerline must be positioned on a portion where amplitude (energy) is maximized in the vibration system.

It is possible to prevent cracking on the fin, because the plate thicker than the fin vibrates relative to the fin. It is possible to support the fin securely and to prevent a deformation of the fin, because the anvil has the comb-shaped blades 13a or 101a.

The flat surface on the contact surface may not precisely corresponded to the attaching portion 1a of the radiator plate 1. The area of the flat surface may be varied in a permissible range that an ability of the conduction of heat and an ability of the transmission of vibration are maintained. For instance, the knurls may be not formed on a part of an adjacent area of the flat surface. In the first embodiment, the knurl 12 is the trapezoidal pyramid-shape. In the second embodiment, a hemisphere-shaped protrusion is formed as a knurl as shown in FIG. 11. However, the shape of the knurl is not limited. In this specification, the flat surface means a substantially flat surface.

In the above-mentioned embodiments, only one piece of the radiator plate 1 is joined on the fin 2. However, the present invention may be applied to, for instance, a construction having a plurality of radiator plates stacked to sandwich the fin. Further, the present invention may be applied to other products, not limited for the CPU cooler.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An ultrasonically joining apparatus for joining a first member and a second member, said first member having a first portion where a heat generator is attached and a second portion where said heat generator is not attached, comprising:

an oscillator for outputting a high frequency electric power;

a vibrator for transforming said high frequency electric power into an ultrasonic vibration;

a cone for converting said ultrasonic vibration; and a horn pressed against said first member for transmitting said converted ultrasonic vibration to said first member, said horn having a high friction surface formed thereon in correspondence with said second portion of said first member for contacting said first member to prevent a slide of said horn relative to said first member, and a protective surface formed thereon in correspondence with said first portion of said first member for protecting said first member, said protective surface being more harmless to said first member relative to said high friction surface.

2. An ultrasonically joining apparatus according to claim 1, wherein said high friction surface surrounds said protective surface.

3. An ultrasonically joining apparatus according to claim 1, wherein said high friction surface has a plurality of knurls.

4. An ultrasonically joining apparatus according to claim 1, wherein said protective surface is a flat surface.

5. An ultrasonically joining apparatus according to claim 1, wherein said protective surface can contact said first member.

6. An ultrasonically joining apparatus according to claim 1, wherein said first member is a radiator plate and said second member is a fin for enhancing radiator of said radiator plate.

7. An ultrasonically joining method for joining a first member and a second member, said first member having a first portion where a heat generator is attached and a second portion where said heat generator is not attached, comprising:

positioning said first member and said second member between a horn and an anvil;

facing a protective surface formed on said horn to said first portion of said first member;

pressing said horn against said first member to contact said first member;

cutting a knurl formed on said horn into said second portion of said first member to prevent a slide while said first portion is protected by said protective surface in a harmless manner; and applying an ultrasonic vibration to said first member through said horn.

8. An ultrasonically joining method according to claim 7, wherein said cutting step comprises cutting a plurality of knurls formed on said horn into said second portion which is formed to surround said first portion.

9. An ultrasonically joining method according to claim 7, further comprising contacting said protective surface with said first member.

10. An ultrasonically joining method according to claim 7, wherein said first member is a radiator plate and said second member is a fin for enhancing radiator of said radiator plate.

11. An ultrasonically joining method for joining a first member and a second member thinner than said first member, comprising:

pressing said first member against said second member; and vibrating said first member using said apparatus;

wherein said first member is a plate, and said second member is a corrugated fin.

12. An ultrasonically joining method according to claim 11, wherein said first member has a first portion where a heat generator is attached and a second portion where said heat generator is not attached, wherein said pressing step comprises positioning said first member and said second member between a horn and an anvil, facing a protective surface formed on said horn to said first portion of said first member, pressing said horn against said first member to contact said first member and cutting a knurl formed on said horn into said second portion of said first member to prevent a slide while said first portion is protected by said protective surface in a harmless manner, and wherein said vibrating step comprises applying an ultrasonic vibration to said first member through said horn.

13. An ultrasonically joining method according to claim 11, wherein said corrugated fin has a louver.

* * * * *